Patented Jan. 11, 1927.

1,613,724

UNITED STATES PATENT OFFICE.

LOUIS M. ROSSI, OF PERTH AMBOY, NEW JERSEY, ASSIGNOR TO BAKELITE CORPORATION, OF NEW YORK, N. Y., A CORPORATION OF DELAWARE.

METHOD OF MAKING A PHENOLIC RESIN VARNISH.

No Drawing.   Application filed December 15, 1924. Serial No. 756,052.

This invention relates to phenolic resins, and particularly to the so-called aqueous solutions of such resins; and comprises a novel method of preparing such solutions. As is well understood in this art, phenolic resins, whether of the non-reactive type or of the potentially reactive type, are soluble in alkaline solutions, as for example aqueous solutions of caustic alkalies, or of the hydroxids of the alkaline earths; and it has been proposed heretofore to employ such aqueous solutions, in place of solutions of the resins in alcohol or other organic solvents, for the various purposes for which phenolic resin varnishes or lacquers are applicable, as for example the preparation of laminated fabrics or papers, the manufacture of molding mixtures, etc.

These aqueous solutions, as heretofore prepared, present certain disadvantages as compared with the more expensive alcoholic solutions. For example paper coated with the aqueous resin solutions is relatively "tender" while wet, and is handled with difficulty on the ordinary coating machines. Moreover products of high dielectric strength can be prepared with these solutions only by the exercise of considerable care.

According to the present invention aqueous solutions of potentially reactive phenolic resins may be prepared, which are free from the above mentioned objectionable qualities and which likewise possess certain added valuable characteristics. The method in its preferred embodiment comprises the preparation in alkaline solution of a potentially reactive phenolic resin soluble therein; the conversion of this potentially reactive resin in solution into a resin of lesser reactivity likewise in solution; and the restoration of the reactive character of the latter resin by the addition thereto of a suitable so-called hardening agent, comprising a body having reactive methylene groups (substituted or not) as for example hexamethylene-tetramine, or formaldehyde, or an aldehyde body of higher molecular weight.

As is now well understood in this art, the non-reactive phenolic resins are such as may be maintained permanently in fusion, in contradistinction to the reactive resins, which under sufficient application of heat are transformed to an infusibe or "resinoid" modification insoluble in all ordinary solvents. The reactive character of these latter resins is due to the presence of a sufficient proportion of reactive or mobile methylene groups, (or substituted methylene groups); and the reactive resins may be rendered non-reactive by incorporating therewith any substance which is capable of entering into reaction with a portion of the methylene groups. For instance free phenolic bodies, or phenolic resins containing free phenols may be used for this purpose; or an effect which is similar in some respects may be obtained by the addition of certain natural resins, including ordinary rosin or colophony, which addition greatly reduces the reactivity, or reaction velocity, of the resin. In the preferred embodiment of the present invention, the reagent employed to reduce the reactive character of the resin as initially prepared is colophony.

Following is a specific example of the invention, it being understood that it is not limited to the specific proportions, or to the particular materials, mentioned therein by way of example.

A typical formula comprises: Phenol, 1 kg.; formaldehyde, 0.9 kg.; caustic soda, .03 kg.

The reaction is allowed to proceed for about one-half hour at the boiling temperature. Then add with vigorous stirring 0.38 kg. of coarsely powdered rosin; boil; and when perfectly homogeneous add .091 kg. of hexamethylenetetramine in concentrated solution. Cool directly if a thin liquid product is desired. To thicken, distil off the water to the desired viscosity, and cool. The product in either case is a homogeneous, transparent liquid.

This solution or varnish is potentially reactive and is directly applicable for use in the coating of papers or fabrics, as for instance for the manufacture of laminated products; for the manufacture of molding mixtures; and in general for those purposes to which the known alcoholic solutions of the phenolic resins are applicable.

Laminated products prepared with the aid of these varnishes are of excellent grade, exhibiting no tendency to cleave, and possessing tensible strength and dielectric puncture values comparing favorably with similar laminated products prepared with alcoholic phenolic varnishes. An important, advantageous and unexpected characteristic of the aqueous varnishes prepared as above is that they resemble the alcoholic varnishes in their tendency to remain on the surface of the paper or fabric, instead of being quickly absorbed therein. The usual tendering of the paper and consequent tendency to pull and tear, which is quite marked with ordinary aqueous solutions, is likewise absent; and papers coated with these aqueous varnishes can be handled in automatic coating machines. Satisfactory molding mixtures can also be prepared by their use.

The within described method is to be clearly distinguished from that described in the U. S. Patent 1,146,299, patented July 13, 1915, to J. W. Aylsworth, according to which a filling material is incorporated with a non-reactive or reactive phenolic resin in aqueous alkaline solution, and the resin is then precipitated in and upon the filling material by neutralizing the alkaline solvent, as for example by the addition of a fatty acid or an acid resin when the solvent is a hydroxid of an alkali metal, or by the use of carbon dioxid, oxalic or sulfuric acid when the solvent is an alkali earth metal hydroxid. According to this patent there is no such conversion of a potentially reactive resin into a less reactive modification, followed by a restoration of its reactivity, as characterizes the present invention.

I claim:

1. The method of making a phenolic resin varnish comprising preparing an aqueous alkaline solution of a reactive phenolic resin; adding thereto a substance capable of lessening the reactivity of the resin; and restoring its reactivity by addition of a methylene-containing reagent.

2. The method of making a phenolic resin varnish comprising preparing an aqueous alkaline solution of a reactive phenolic resin; adding thereto a resinous substance capable of lessening the reactivity of the phenolic resin; and restoring its reactivity by addition of a methylene-containing reagent.

3. The method of making a phenolic resin varnish comprising preparing an aqueous alkaline solution of a phenolic resin; dissolving rosin in said solution; and increasing the reactivity of the resulting resinous composition by adding thereto a methylene-containing reagent.

In testimony whereof, I affix my signature.

LOUIS M. ROSSI.